United States Patent
Bybell

(10) Patent No.: US 8,250,345 B2
(45) Date of Patent: Aug. 21, 2012

(54) STRUCTURE FOR MULTI-THREADED PROCESSING

(75) Inventor: Anthony J. Bybell, Carrboro, NC (US)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 12/110,406

(22) Filed: Apr. 28, 2008

(65) Prior Publication Data

US 2009/0089817 A1    Apr. 2, 2009

Related U.S. Application Data

(63) Continuation-in-part of application No. 11/863,452, filed on Sep. 28, 2007.

(51) Int. Cl.
*G06F 7/00* (2006.01)
(52) U.S. Cl. ..................................... 712/217
(58) Field of Classification Search .......................... None
See application file for complete search history.

(56) References Cited

U.S. PATENT DOCUMENTS

| 7,584,342 | B1 * | 9/2009 | Nordquist et al. | 712/22 |
| 2004/0215892 | A1 | 10/2004 | Fluhr et al. | |
| 2004/0268093 | A1 * | 12/2004 | Samra et al. | 712/217 |
| 2009/0089553 | A1 | 4/2009 | Bybell | |

OTHER PUBLICATIONS

U.S. Appl. No. 11/863,452, filed Sep. 28, 2007, entitled, "Multi-Threaded Processing,".

* cited by examiner

*Primary Examiner* — Eddie P Chan
*Assistant Examiner* — John Lindlof
(74) *Attorney, Agent, or Firm* — Matthew C. Zehrer

(57) ABSTRACT

A design structure embodied in a machine readable storage medium designing, manufacturing, and/or testing a design that includes a multi-threaded processor that executes an instruction of a process of an executing program is provided. The multi-threaded processor includes at least a first and a second thread. First and second sets of source registers are respectively allocated to the first and second threads, and first and second sets of destination registers are respectively allocated to the first and second threads. A resource prefix configuration register includes mappings between each of the source and destination registers and the threads. The multi-threaded processor, during execution of the instruction by one of the first or the second threads of execution, accesses the source and destination registers based on the mapping, wherein at least one of the accessed registers is allocated to the other of the first or the second thread of execution.

18 Claims, 3 Drawing Sheets

STRUCTURE FOR MULTI-THREADED PROCESSING

CROSS-REFERENCE TO RELATED APPLICATIONS

This application is a continuation-in-part of co-pending U.S. patent application Ser. No. 11/863,452, filed Sep. 28, 2007, which is herein incorporated by reference.

BACKGROUND OF THE INVENTION

Field of Invention

The following generally relates to design structures, and more specifically, design structures for multithreaded processing and, more particularly, for using thread resources of an inactive thread, in addition to the thread resources of an active thread, when executing an instruction with the active thread of the multithreaded processor.

With a multi-threaded processor, multiple threads of execution exist within the context of each process. The threads of a particular process are executed in a manner in which the processor quickly switches between different threads such that it appears that threads are being simultaneously executed. A simple type of multi-threading is where one thread runs until an event, such as a cache-miss that has to access off-chip memory, which might create a long latency. Rather than waiting, the processor switches to another thread that is ready to run. When the data for the previous thread arrives, the previous thread is placed back on the list of ready-to-run threads. In another type of multi-threading, the processor switches threads every CPU cycle.

Each process is allocated resources such as registers by the operating system, and such resources are allocated to the process' threads such that each thread owns its own resources, which are used when a thread is employed to execute an instruction. When a process is created, it is stored in main memory. Once the kernel assigns the process to a processor, the process is loaded into the processor and the processor executes the process's instructions using its resources.

A thread arbiter and/or thread priority determines which thread of execution to use to execute an instruction, and a thread identifier (ID) is associated with and follows the instruction through its various states of execution. The instruction is executed using the resources, such as the registers, of the thread that corresponds to the thread ID. When switching threads, the thread arbiter or thread priority determines the next thread to employ, and a thread ID of the next thread is associated with and follows the next instruction through its various states of execution. Likewise, the instruction is executed using the resources of the thread that corresponds to the thread ID of the next thread.

SUMMARY OF THE INVENTION

In one aspect, a system includes a multi-threaded processor that executes an instruction of a process of an executing program. The multi-threaded processor includes at least a first thread of execution and a second thread of execution. The system further includes a plurality of source and destination registers, wherein a first set of the source registers is allocated to the first thread of execution, a second set of the source registers is allocated to the second thread of execution, a first set of the destination registers is allocated to the first thread of execution, and a second set of the destination registers is allocated to the second thread of execution. The system further includes a resource prefix configuration register that includes mapping between each of the source and destination registers and the threads of execution. The multi-threaded processor, during execution of the instruction by one of the first or the second threads of execution, accesses the source and destination registers based on the mapping, wherein at least one of the accessed registers is allocated to the other of the first or the second thread of execution.

In another aspect, a multi-threading method includes using a first of a plurality of threads of a processor to execute an instruction of a process, providing a first mapping between a source register identified in the instruction and a second of the plurality of threads, reading an operand from the register identified in the instruction in the second of the plurality of threads, and performing an operation identified in the instruction on the operand.

In another aspect, a multi-threaded processor includes at least two threads of execution, wherein the multi-threaded processor uses one of the at least two threads of execution to execute an instruction of a process, and the one of the at least two threads of execution utilizes resources allocated to the one of the at least two threads of execution and utilizes resources allocated to the other of the at least two threads of execution to execute the instruction.

In yet another aspect, a design structure embodied in a machine readable storage medium for at least one of designing, manufacturing, and testing a design is provided. The design structure generally includes a system that includes a multi-threaded processor that executes an instruction of a process of an executing program, wherein the multi-threaded processor includes at least a first thread of execution and a second thread of execution, a plurality of source registers, wherein a first set of the source registers are allocated to the first thread of execution and a second set of the source registers are allocated to the second thread of execution, a plurality of destination registers, wherein a first set of the destination registers are allocated to the first thread of execution and a second set of the destination registers are allocated to the second thread of execution, and a resource prefix configuration register that includes a first mapping between each of the source registers in the first and second sets of the source registers and one of the at least two threads of execution, and a second mapping between each of the destination registers in the first and second sets of destination registers and one of the at least two threads of execution, wherein the multi-threaded processor, during execution of the instruction by one of the first or the second threads of execution, accesses source and destination registers respectively based on the first and second mappings, and wherein at least one of the accessed registers is allocated to the other of the first or the second thread of execution.

In yet another aspect, a design structure embodied in a machine readable storage medium for at least one of designing, manufacturing, and testing a design is provided. The design structure generally includes a multi-threaded processor that includes at least two threads of execution, wherein the multi-threaded processor uses one of the at least two threads of execution to execute an instruction of a process, and the one of the at least two threads of execution utilizes resources allocated to the one of the at least two threads of execution and utilizes resources allocated to the other of the at least two threads of execution to execute the instruction.

BRIEF DESCRIPTION OF THE DRAWINGS

These and other features will be more readily understood from the following detailed description of various examples taken in conjunction with the accompanying drawings in which.

The drawings are merely representations and are not intended to portray specific elements. The drawings are intended for explanatory purposes and should not be considered as limiting scope.

DETAILED DESCRIPTION OF THE INVENTION

Figure 1:
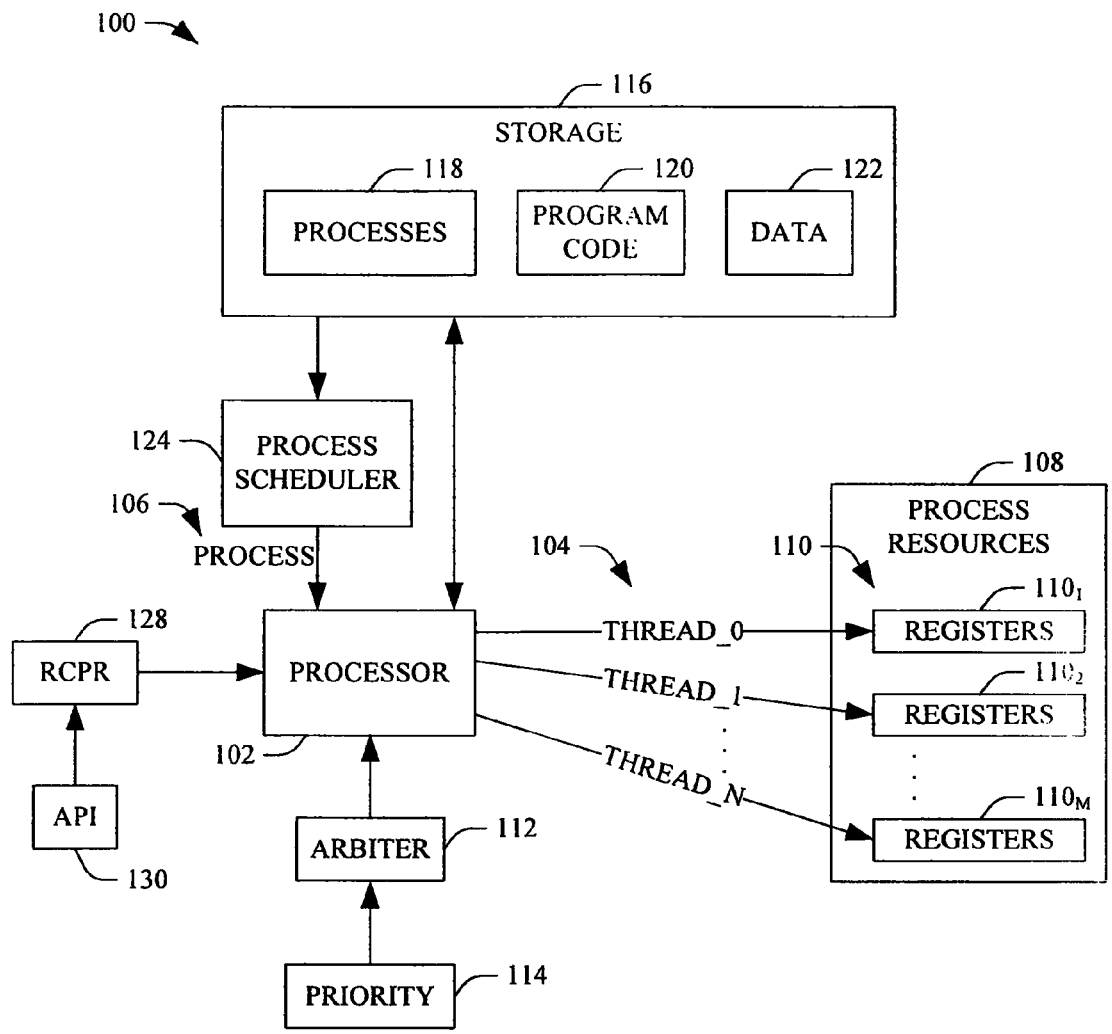
FIG. 1 illustrates a system that includes a multi-threaded processor.

FIG. 1 illustrates part of a computing system 100 such as a computer or other system that includes one or more processors, which may reside on the same or different dies. For sake of brevity and clarity, the illustrated system 100 is shown with a single, multithreaded processor 102. The processor 102 can perform various functions, such as, but not limited to, executing instructions, exchanging data with the system's memory and/or peripherals, managing the system's other components, etc.

The illustrated processor 102 includes N threads of execution 104, thread_0, thread_1 thread_N. The processor 102 may use one or more of the threads of execution 104 when executing an instruction. For instance, the processor 102 may be run in single thread mode in which only one of the N threads is active. In another instance, the processor 102 may be run in multi-thread mode in which two to N threads are active. As discussed in greater detail below, active threads can use their respective resources as well as the resources of inactive threads when executing an instruction. In one instance, this allows access to the resources of the threads 104 in a non-orthogonal fashion and may increase the number of registers available to an active thread.

For each process, the operating system allocates resources 108, which include, but are not limited to, various registers, file handles, security attributes, processor state, etc. Such resources 108 are shared across the threads 104 of a process. As shown, the resources 108 include multiple registers 110, wherein a first set of registers $110_1$ has been allocated to the thread_0, a second set of registers $110_2$ has been allocated to the thread_1 and an Mth set of registers $110_M$ has been allocated to the thread_N.

As will be appreciated, the registers 110 may include one or more of general purpose registers (GPR's), floating point registers (FPR's), special purpose registers (SPR), etc. In addition, the number of the registers 110 and the number of bytes in each of the registers 110 may vary. For example, in one instance, at least one of the sets of registers $110_1$, $110_2$, . . . , $110_M$ includes thirty-two, 64-bit registers. Moreover, the registers 110 may be physical registers or copies of registers.

A storage component 116, which may include or be part of main memory, stores information such as one or more created processes 118 for an executing program, program code 120, data 122, as well as other computer readable information.

A process scheduler 124 schedules the one or more processes 118 for execution by the processor 102. As shown in this example, the process scheduler 124 has scheduled a process 106 for execution and, as such, the process 106 is loaded into the processor 102. As noted above, when multiple processors are available the kernel first determines which processor will handle the process and then the process is loaded to the respective processor.

A resource prefix configuration register (RPCR) 128, which may be a single register as shown or a set of registers, provides a mapping between the register(s) in an instruction and one or more of the threads of execution 104. Such a mapping is used to prepend a thread ID to the resource specified by a given opcode field in an instruction. Using such a mapping, a thread can use its resources and/or the resources of one or more inactive threads when executing the instruction. As such, the total number of registers available to an active thread may be increased.

It is to be appreciated that this mapping may override the single thread ID that is typically generated in a system that does not employ the RPCR 128. For example, a thread arbiter 112 may be used to determine which thread 104 is used by the processor 102 when the processor 102 executes an instruction. As shown, the thread arbiter 112 may use a thread priority 114 to facilitate identifying the thread 104 to be employed by the processor 102 for a particular instruction. The system can be configured so that the mapping provided by the RCPR 128 selectively overrides the arbiter 112.

An application programming interface (API) 130 provides an interface that allows a user to define the mapping in the RCPR 128. It is to be appreciated that the complier may alternatively be used to define the mapping.

In operation, once the kernel has identified the processor 102 and the process 106 is loaded in the processor 102, the processor 102 executes the process' instructions. This includes fetching an instruction of the process and decoding the instruction. Generally, such an instruction may include the operation to be performed and, if any, the source register of the operand(s) to be operated on and/or the destination register for the result. The operation may include, for example, an arithmetic operation, data copying operation, a logical operation, a program control operation, etc. The processor 102 then executes the decoded instruction.

As can be appreciated, in some instances executing the instruction may include reading data from one or more registers, operating on the data, and/or writing the results of the operation to one or more registers. In such instances, the processor 102 utilizes the mapping from the RCPR 128 to determine which thread and which thread register to read from and/or write to.

Figure 2:
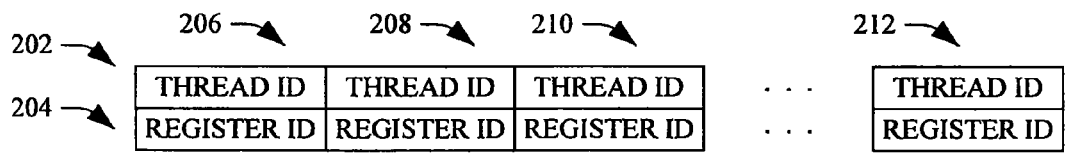
FIG. 2 illustrates a mapping between source and destination thread registers and a particular thread of execution for an instruction.

FIG. 2 illustrates a non-limiting example of such a mapping. In FIG. 2, a row 204 includes a plurality of fields for identifying a register via a register identifier (REGISTER ID) and a row 202 includes a plurality of fields for identifying a thread via a thread identifier (THREAD ID). Each column 206, 208, 210, 212 maps a REGISTER ID to a THREAD ID.

By way of example, the process 106 may include the following instruction: XOR RA, RS, RB, wherein XOR represents the exclusive OR logical operation, RA represents the destination or result general purpose register, and RS and RB represent the source or operand general purpose registers. Execution of this instruction includes retrieving the operands from the RS and RB registers, XORing them together, and storing the result in the RA register. With reference to the example mapping in FIG. 2 and the above example instruction, a possible mapping for the instruction is depicted in Table 1 below.

TABLE 1

Example RCPR mapping.

| Thread ID: | 00 | 00 | 01 | 00 | ... |
|---|---|---|---|---|---|
| Register ID: | RT | RS | RA | RB | ... |

With this mapping, the general purpose source registers RS and RB are mapped to thread_0 (Thread ID 00) and the general purpose destination register RA is mapped to thread_1 (Thread ID 01). As such, the instruction will result in reading the operands from the general purpose source registers RS and RB of thread_0 (Thread ID 00), performing the XOR operation with the operands, and writing the result of the XOR operation to the general purpose destination register RA of thread_1 (Thread ID 01). It is to be appreciated that the above is only an example. In another implementation the source registers RS and RB may be from different threads, one of the source registers RS or RB may be from the same thread as the destination register RA, etc. Of course, other instructions are also contemplated herein.

In the above example, the general purpose registers RS, RA, and RB are utilized. With other instructions, other general purpose registers such as RT, floating point registers such as FRT, FRA, FRB, FRC, etc., and/or special purpose registers such as SPR may additionally or alternatively be used.

When operating in single thread mode, the processor 102 executes the instruction via one thread (e.g., thread_0), which reads and/or writes to the registers of one or more of the threads 104, including its registers and/or one or more of the registers of one or more of the inactive threads thread_1, . . . , thread_N. In this mode, the processor 102 is provided with a copy of and/or access to the mapping in the RCPR 128. As noted above, in one example each thread has thirty-two (32) 64-bit registers. By overloading the thread ID using the mapping, the active thread of a two-threaded processor may use up to sixty-four (64) registers, the active thread of a four-threaded processor may use up to one hundred and twenty-eight (128) registers.

In multi-thread mode, each active thread includes a copy of and/or has access to the mapping in the RCPR 128. For example, assume that the processor 102 includes four (N=4) threads of operation, thread_0, thread_1, thread_2, and thread_3. Also assume that only two (2) of the threads, thread_0 and thread_3 are active, and that thread_0 uses the resources of thread_0 thread_1 and thread_2 and that thread_3 only uses the resources of thread_3. Both of the active threads, thread_0 and thread_3, would be provided with a copy of and/or access to the mapping in the RCPR 128. Such information can be used by the software and/or hardware to mitigate attempts by thread_0 to access the resources used by thread_3 (the resources of thread_3), and attempts by thread_3 to access the resources used by thread_0 (the resources of thread_0 thread_1 and thread_2).

In another example, active thread_0 only uses the resources of inactive thread_2, and active thread_1 only uses the resources of inactive thread_3. In this instance, both of the active threads, thread_0 and thread_1 would be provided with a copy of and/or access to the mapping in the RCPR 128. Such mapping may be used when one or more of the resources of thread_0 and thread_1 are corrupt. Various other permutations are also contemplated herein.

Figure 3:
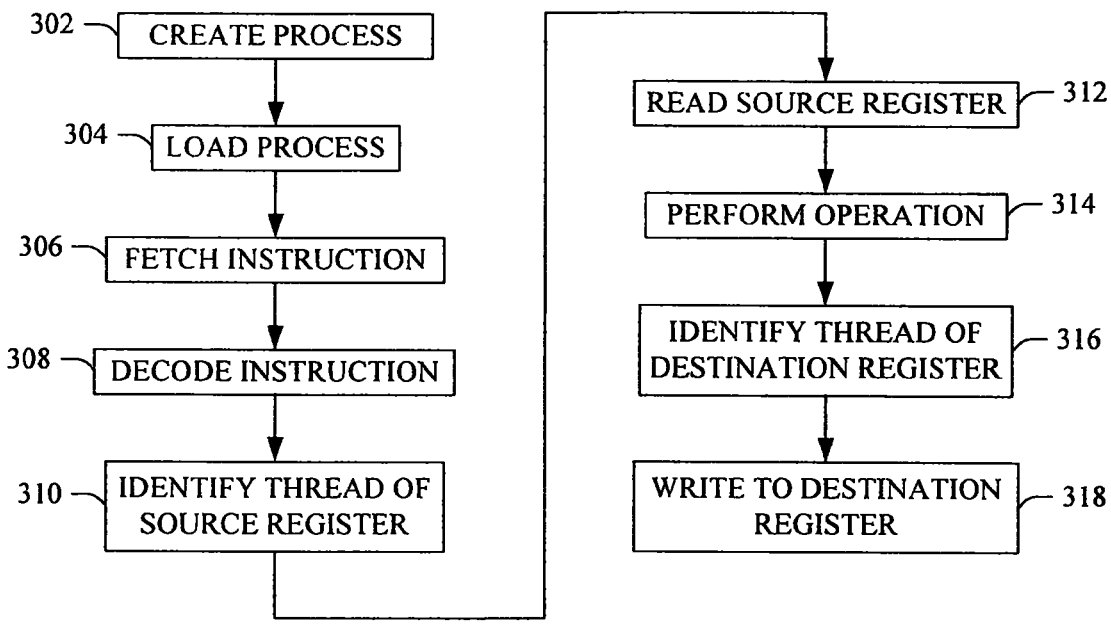
FIG. 3 illustrates a multi-threading method.

FIG. 3 illustrates a multi-threading method. The following is described in the context of a multi-threaded processor executing in single thread mode and an instruction that includes an operation, at least one operand source register, and at least one destination register. However, in other examples, more than one processor may be used, one or more of such processors may alternatively be ran in multi-threaded mode, and the instruction may alternatively only include a data copying operation, a program control operation, etc.

At reference numeral 302, a process is created, for example, for an executing program. At 304, the process is loaded in the processor. As noted above, with a multiprocessor system, the kernel first selects the processor that will execute the process. At 306, the processor fetches an instruction of the process. The schedule processor 124 or other technique may be used to determine process ordering. At 308, the processor decodes the instruction, including determining any operations, source registers and/or destination registers. At 310, the processor utilizes a mapping between the source registers and the threads of execution to identify which of the threads to read from to obtain an operand(s).

At 312, the processor reads the operand(s) from the source register(s) of the identified thread(s). At 314, the processor performs the operation on the operand(s). At 316, the processor utilizes a mapping between the destination registers and the threads of execution to identify which thread's register to write the result. At 318, the processor writes the result in the identified register of the identified thread. The processor the fetches the next instruction, for example, as determined by the process scheduler 124, if any, and repeats 306 through 318. Otherwise, a next process, if any, is loaded in the processor.

Figure 4:
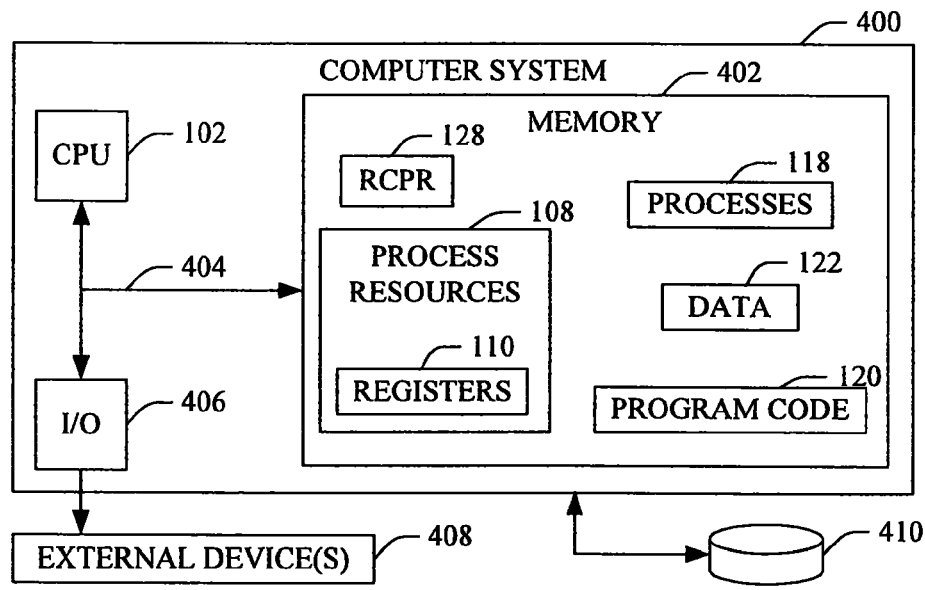
FIG. 4 illustrates an example of a computer system in which the multi-threading method can be employed.

Referring now to FIG. 4, an exemplary computer system 400 in which the system 100 can be utilized with is illustrated. As shown, the computer system 400 includes the multi-threaded processor (CPU) 102, memory 402, a bus 404, and input/output (I/O) interfaces 406. The memory 402 includes the RCPR 128 or a copy of the RCPR 128, the processes 118, the data 122, the program code 120, and the process resources 108, including the registers 110.

Further, the computer system 400 is shown in communication with external devices 408 and an external storage system 410. The external devices 408 can comprise any devices (e.g., keyboard, pointing device, display, etc.) that enable a user to interact with computer system 400 and/or any devices (e.g., network card, modem, etc.) that enable computer system 400 to communicate with one or more other computing devices. The external storage system 410 includes memory such as a hard disk, a floppy disk, portable memory, etc.

In general, the CPU 102 executes instructions of processes. While executing such instructions, the CPU 102 can read and/or write data to/from the memory 402, such as to/from the registers 110 of the process resources 108. As discussed above, different sets of the registers 110 allocated to a process are allocated to each of the threads of the CPU 102. The CPU 102 accesses the RCPR 128 or the copy of the RCPR 128 to obtain a mapping between the registers identified in the instruction and the different threads of execution. The mapping provides an override that allows a thread of execution executing an instruction to use the resources 108, including the registers 110, of inactive threads of execution, along with its own resources, to facilitate execution of the instruction.

Figure 5:
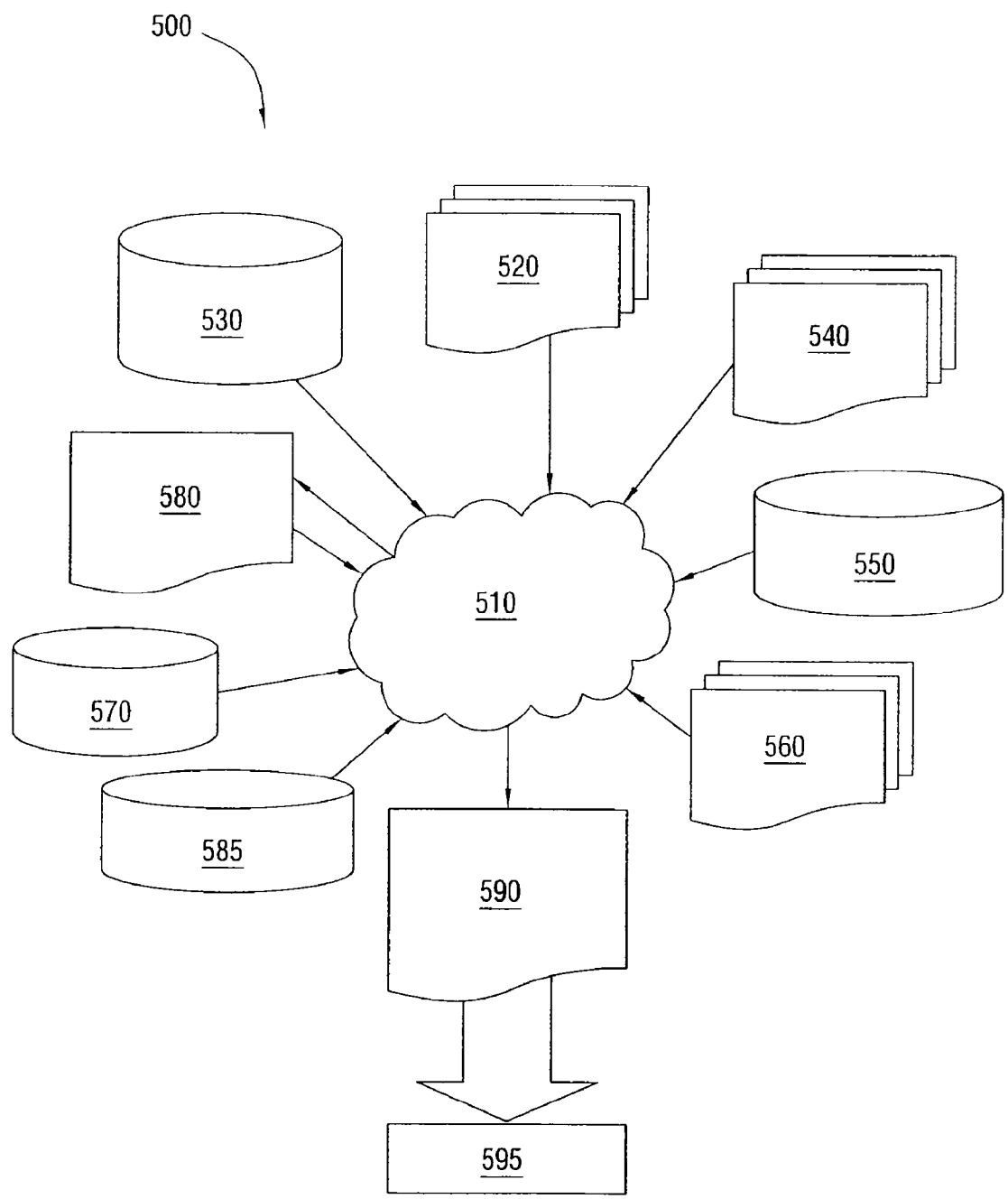
FIG. 5 is a flow diagram of a design process used in semiconductor design, manufacture, and/or test.

FIG. 5 shows a block diagram of an exemplary design flow 500 used for example, in semiconductor design, manufacturing, and/or test. Design flow 500 may vary depending on the type of IC being designed. For example, a design flow 500 for building an application specific IC (ASIC) may differ from a design flow 500 for designing a standard component. Design structure 520 is preferably an input to a design process 510 and may come from an IP provider, a core developer, or other design company or may be generated by the operator of the design flow, or from other sources. Design structure 520) comprises the circuits described above and shown in FIGS. 1 and 4 in the form of schematics or HDL, a hardware-description language (e.g., Verilog, VHDL, C, etc.). Design structure 520 may be contained on one or more machine readable medium. For example, design structure 520 may be a text file or a graphical representation of a circuit as described above and shown in FIGS. 1 and 4. Design process 510 preferably synthesizes (or translates) the circuit described above and shown in FIGS. 1 and 4 into a netlist 580, where netlist 580 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 580 is resynthesized one or more times depending on design specifications and parameters for the circuit.

Design process 510 may include using a variety of inputs; for example, inputs from library elements 530 which may house a set of commonly used elements, circuits, and devices, including models, layouts, and symbolic representations, for a given manufacturing technology (e.g., different technology nodes, 32 nm, 45 nm, 90 nm, etc.), design specifications 540, characterization data 550, verification data 560, design rules 570, and test data files 585 (which may include test patterns and other testing information). Design process 510 may further include, for example, standard circuit design processes such as timing analysis, verification, design rule checking, place and route operations, etc. One of ordinary skill in the art of integrated circuit design can appreciate the extent of possible electronic design automation tools and applications used in design process 510 without deviating from the scope and spirit of the invention. The design structure of the invention is not limited to any specific design flow.

Design process 510 preferably translates a circuit as described above and shown in FIGS. 1 and 4, along with any additional integrated circuit design or data (if applicable), into a second design structure 590. Design structure 590 resides on a storage medium in a data format used for the exchange of layout data of integrated circuits (e.g. information stored in a GDSII (GDS2), GL1, OASIS, or any other suitable format for storing such design structures). Design structure 590 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIGS. 1 and 4. Design structure 590 may then proceed to a stage 595 where, for example, design structure 590: proceeds to tape-out, is released to manufacturing, is released to a mask house, is sent to another design house, is sent back to the customer, etc.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A design structure embodied in a hardware-description language and stored on a machine readable storage medium for at least one of designing, manufacturing, and testing a design, the design structure comprising: a multi-threaded system, comprising: a multi-threaded processor that maps identifying fields of each of a plurality of source registers and a plurality of destination registers to different respective identifying fields of each of a plurality of threads of instruction; wherein a first of the source registers and a first of the destination registers are mapped to a first thread; wherein a second of the source registers and a second of the destination registers are mapped to a second thread; and wherein the first thread is different from the second thread, and each of the first and second source registers and the first and second destination registers are different from each other of the first and second source registers and the first and second destination registers; and wherein the processor executes an instruction of the first thread when the second thread is inactive by: providing access by the first thread to the mapping of the second thread to the second source register and the second destination register if the second thread is inactive; using the mapping of the second thread to the second source register and the second destination register to execute the instruction of the first thread by reading from the second source register and writing to the second destination register; using the mapping of the first thread to the first source register and the first destination register to execute the instruction of the first thread by reading from the first source register and writing to the first destination register; and mitigating any attempt by the second thread to read from the second source register or write to the second destination register still mapped to the second thread while the first thread is using said second source register to execute the instruction of the first thread.

2. The design structure of claim 1, wherein the multi-threaded processor executes in single thread mode in which only one of the first and second threads of execution is active and the other of the first and second threads of execution is inactive, and the active thread of execution reads data from a source register from the set of source registers allocated to the inactive thread of execution based on the mapping.

3. The design structure of claim 1, wherein the multi-threaded processor executes in single thread mode in which only one of the first and second threads of execution is active and the other of the first and second threads of execution is inactive, and the active thread of execution writes data to a destination register from the set of destination registers allocated to the inactive thread of execution based on the mapping.

4. The design structure of claim 1, wherein the first and second mappings override previously determined thread identifiers for instructions and follow the instructions during their various states of execution.

5. The design structure of claim 1, wherein the multi-threaded processor executes in multi-threaded mode and includes at least a third and a fourth thread of execution, the first and second threads of execution are active, the third and fourth threads of execution are inactive, and each of the first and second active threads is provided with a copy of the mappings.

6. The design structure of claim 5, wherein at least one of the first and second active threads uses its own registers and registers allocated to at least one of the third and fourth inactive threads.

7. The design structure of claim 5, wherein both of the first and second active threads use registers allocated to an inactive thread, and each of the first and second active threads uses registers allocated to different ones of the third and fourth inactive threads.

8. The design structure of claim 1, wherein the one of the first or the second threads of execution executing the instruction accesses registers from different threads in a non-orthogonal manner.

9. The design structure of claim 1, wherein the multi-threaded processor uses the first thread of execution to execute the instruction, and the first mapping maps a source register identified in the instruction to the second thread of execution.

10. The design structure of claim 1, wherein the multi-threaded processor uses the first thread of execution to execute the instruction, and the second mapping maps a destination register identified in the instruction to the second thread of execution.

11. The design structure of claim 1, wherein the plurality of registers include one or more of a general purpose register, a floating point register, and a special purpose register.

12. The design structure of claim 1, further including an application programming interface that provides an interface for defining the mapping.

13. The design structure of claim 1, wherein the design structure comprises a netlist, which describes the system.

14. The design structure of claim 1, wherein the design structure resides on the machine readable storage medium as a data format used for the exchange of layout data of integrated circuits.

15. The design structure of claim 1, the multi-threaded system further comprising:
a resource prefix configuration register in communication with the multi-threaded processor, wherein the resource prefix configuration register stores the mapping;
wherein the multi-threaded processor uses the mapping stored in the resource prefix configuration register to read from the second source register and write to the second destination register.

16. The design structure of claim 15, the multi-threaded system further comprising:
an application programming interface in communication with the resource prefix configuration register, wherein the application programming interface provides an interface that allows a user to define the mapping in the resource prefix configuration register.

17. The design structure of claim 15, the multi-threaded system further comprising:
a compiler in communication with the resource prefix configuration register, wherein the compiler defines the mapping in the resource prefix configuration register.

18. The design structure of claim 1, the multi-threaded system further comprising:
a thread arbiter in communication with the multi-threaded processor, wherein the thread arbiter determines which thread is used by the multi-threaded processor when the multi-threaded processor executes an instruction;
wherein the thread arbiter uses a thread priority to facilitate identifying the first thread executed by the processor; and
wherein the thread arbiter selectively overrides the mapping during the executing of the instruction of the first thread via the processor when the second thread is inactive.

* * * * *